United States Patent
Linke et al.

(10) Patent No.: US 10,077,179 B2
(45) Date of Patent: Sep. 18, 2018

(54) ROTOR OF A DEVICE FOR FORMING AND/OR FILLING CONTAINERS MADE FROM PREFORMS

(71) Applicant: KHS Corpoplast GmbH, Hamburg (DE)

(72) Inventors: Michael Linke, Hamburg (DE); Michael Litzenberg, Geesthacht (DE); Niels Meyer, Schenefeld (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 15/568,564

(22) PCT Filed: May 2, 2016

(86) PCT No.: PCT/EP2016/000707
§ 371 (c)(1),
(2) Date: Oct. 23, 2017

(87) PCT Pub. No.: WO2016/173720
PCT Pub. Date: Nov. 3, 2016

(65) Prior Publication Data
US 2018/0111812 A1  Apr. 26, 2018

(30) Foreign Application Priority Data
Apr. 30, 2015 (DE) .................. 10 2015 005 457

(51) Int. Cl.
*B65G 29/00* (2006.01)
*B65G 47/84* (2006.01)
(Continued)

(52) U.S. Cl.
CPC ............ *B67C 7/0046* (2013.01); *B29C 49/46* (2013.01); *B65G 29/00* (2013.01); *B65G 47/846* (2013.01);
(Continued)

(58) Field of Classification Search
CPC ............... B67C 7/0046; B67C 7/0053; B67C 2007/0066; B65G 29/00; B65G 47/846;
(Continued)

(56) References Cited

U.S. PATENT DOCUMENTS 4,511,027 A    8/1985  Zamboni
5,110,282 A *  5/1992  Voss ................... B29C 49/4205
                                                   414/744.5
(Continued)

FOREIGN PATENT DOCUMENTS

EP   2179960 A1    4/2010
WO   9835815 A1    8/1998
WO   2015059104 A1 4/2015

*Primary Examiner* — Mark A Deuble
(74) *Attorney, Agent, or Firm* — Rankin, Hill & Clark LLP

(57) ABSTRACT

The present invention relates to a rotor of an apparatus for forming and/or filling containers made from preforms. The object of the invention is to propose a rotor of such an apparatus, that allows the preforms or the filled containers to be transferred with reduced forces to a processing station downstream. This object is achieved by a rotor 100 of such an apparatus having a rotational axis A and having processing stations that rotate about the rotational axis for receiving preforms or containers, wherein the processing stations move along a closed path 1 about the rotational axis A, which is characterized in that the distance of path 1 from the rotational axis A varies depending upon the position on path 1, and the radius of curvature of path 1 in at least one section 12 is greater than the greatest distance of path 1 from the rotational axis A.

8 Claims, 5 Drawing Sheets

Figure 1:
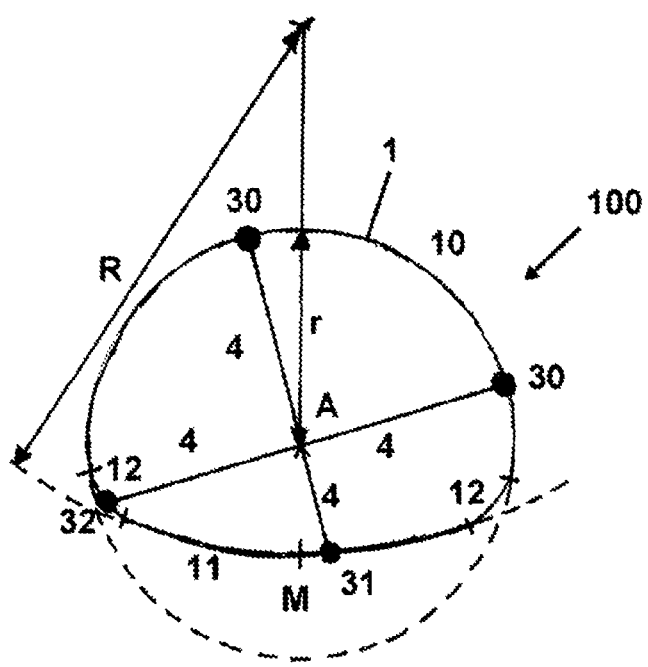

(51) Int. Cl.
  *B29C 49/46* (2006.01)
  *B67C 7/00* (2006.01)
(52) U.S. Cl.
  CPC .... *B67C 7/0053* (2013.01); *B29C 2049/4664* (2013.01)
(58) Field of Classification Search
  CPC ................ B65G 47/847; B65G 47/848; B29C 2049/4664
  See application file for complete search history.

(56) References Cited

U.S. PATENT DOCUMENTS

| | | | |
|---|---|---|---|
| 2008/0166442 A1* | 7/2008 | Balboni | B29B 11/12 425/347 |
| 2008/0210520 A1* | 9/2008 | Legallais | B65G 47/847 198/470.1 |
| 2009/0127076 A1 | 5/2009 | Balboni et al. | |
| 2011/0056809 A1* | 3/2011 | Borgatti | B29C 49/12 198/803.3 |
| 2011/0287127 A1* | 11/2011 | Dupuis | B29C 49/421 425/524 |
| 2012/0266567 A1 | 10/2012 | Haesendonckx et al. | |
| 2012/0285800 A1* | 11/2012 | Kraus | B65G 47/847 198/478.1 |
| 2013/0056331 A1* | 3/2013 | Goeb | B65G 47/848 198/608 |
| 2014/0102855 A1* | 4/2014 | Lanfranchi | B65G 47/848 198/476.1 |
| 2015/0013268 A1* | 1/2015 | Rea | B65B 29/02 53/282 |
| 2015/0069670 A1* | 3/2015 | Hoellriegl | B29C 49/36 264/535 |
| 2015/0217888 A1* | 8/2015 | Nakamoto | B65B 43/465 198/678.1 |
| 2015/0336750 A1* | 11/2015 | Coates | B41F 17/002 198/601 |

* cited by examiner

ROTOR OF A DEVICE FOR FORMING AND/OR FILLING CONTAINERS MADE FROM PREFORMS

The present invention relates to a rotor of an apparatus for forming and/or filling containers made from preforms.

Conventionally, containers, in particular bottles, are formed in a blow-molding process by a pressurized forming gas flowing into a preheated preform, and are then filled with a filling material, in particular a liquid filling material, in a second step. To streamline production, methods have recently been developed in which, rather than being formed by a compressed gas, the preheated preform can be formed and filled in a single step by introducing the pressurized liquid filling material into the preform. Such a method is known, for example, from DE 10 2010 007 541 A1.

Preforms for the known methods are made of a thermoplastic, for example PET, PE or PP, and are typically produced in an injection molding process. For shaping these preforms into containers, it is irrelevant whether they are stored beforehand or are fed to the shaping process immediately after their production.

For a preform to be shaped into a container, it must be thermally conditioned, that is, in particular, heated and furnished with a suitable temperature profile. In this process, the body of the preform is heated to approximately 120° C., for example, and becomes shapeable, whereas the mouth is allowed to reach only significantly lower temperatures, since the preform is held at its mouth area in the forming and filling machine and must not be allowed to deform under the holding forces typically present there.

The preforms or the formed containers are moved through the machine on transport wheels, which include devices for supporting preforms or containers. This movement involves process wheels, which are combined with the forming and filling stations or the sealing stations of the machine, for example, and on which the preform is formed and filled or is sealed, or merely transport wheels, on which the preform or the container is transported from one station to the next.

On the process wheel for forming and filling, a considerable distance between the individual preforms is necessary to provide adequate space for the forming and filling stations. During thermal conditioning, however, closer spacing is advantageous, since the preforms must be thermally conditioned in a relatively small oven.

The spacing is adjusted by means of transfer wheels, which typically have either telescopic or pivotable arms. In the case of telescopic arms, the distances between the preforms can be adjusted by extending the arms. If the arms are short, the distance between neighboring preforms is small; if the arms are long, the distance is great. Transfer wheels with pivotable arms have a fixedly defined arm length. By pivoting the arms horizontally, the distance can be adjusted and changed in a localized manner.

During transfers between the wheels, high accelerations of the preform or container being transferred from one wheel to another occur due to the reversal in the direction of rotation. With such accelerations, substantial forces are generated that exert a load on the supporting elements and can lead to an imbalance in the machine, particularly if the containers are already filled. Furthermore, if the container has not yet been sealed, there is a risk that liquid filling material in the container may spill out, in particular during transfer of the container between the filling station and the sealing station.

The object of the present invention is to propose a rotor of an apparatus for forming and/or filling containers made from preforms that will allow the preforms or the filled containers to be transferred to a processing station downstream, and with which reduced forces are exerted on the preform or the filled container.

This object is achieved by a rotor of an apparatus for forming and/or filling containers made from preforms that has a rotational axis and has processing stations that rotate about the rotational axis for receiving preforms or containers, the processing stations moving along a closed path about the rotational axis. The rotor according to the invention is characterized in that the distance of the path from the rotational axis is different depending upon the position on the path, and the radius of curvature of the path is greater in at least one section than the greatest distance between the path and the rotational axis.

During operation of the apparatus, the rotor according to the invention rotates about a rotational axis. In so doing, it has the function of the above-described process wheels, however the term rotor is chosen here to avoid creating the impression that the periphery of the rotor is circular.

The rotor is equipped with processing stations for receiving the preforms or the formed and potentially already filled containers. During operation, the processing stations move along a closed path around the rotational axis. The distance of this path from the rotational axis is variable and is dependent upon the position on the path. Thus, the path may comprise sections that have different radii of curvature. The path may be fixedly defined over its entire length and identical with each revolution, or may be free and variable in some areas. However, the points of transfer for the preforms or containers in and out of the rotor preferably have defined radial positions.

According to the invention, the radius of curvature of the path is greater in at least one section than the greatest distance between the path and the rotational axis. As a result, the circular acceleration in this section is lower than in the case of a circular path having a constant radius, as is the case with conventional wheels.

Preferably, the path is designed such that the radius of curvature of the path in this section is significantly greater than the greatest distance of the path from the rotational axis.

The forces acting in this area on the blank or the container are significantly reduced as compared with wheels that have a constant diameter. Due to the reduced curvature of the path in this area, it is expedient for the transfer from one rotor to the next within an apparatus for forming and/or filling containers to take place in this area. The forces acting on the preforms or containers during the transfer are significantly reduced as compared with conventional wheels. Less stress is placed on the supporting elements. The risk of a container that is filled but not yet sealed spilling over is decreased.

In one embodiment, the rotor according to the invention has supporting arms for supporting the processing stations. In particular, the supporting arms can be telescopic, pivotable or bendable.

The radial positioning of a processing station can advantageously be cam-controlled.

The processing stations can be equipped with processing devices, in particular with a forming head, a filling head, a combined forming and filling head or a sealing device. Particular advantages result from the use of a rotor according to the invention as the rotor of a filling station and/or the rotor of a sealing station because it enables any spilling over of the filled container to be avoided during the transfer.

For example, containers that have already been produced in a blow molding process can be fed to the rotor of a filling station. If a filled container is to be formed hydraulically in a single step by introducing pressurized filling material into a preform, preforms can be fed to the rotor of a forming and filling station.

In the filling station, the containers are filled or the preforms are shaped into filled containers. The filling head or the forming and filling head must then be removed from the container mouth, and the filled container must be sealed. This normally occurs in a separate sealing station, which is disposed on a further process rotor.

If the filled but as yet unsealed containers are transferred from one conventional process wheel to the next, the risk exists that the forces exerted by the change in the direction of rotation may cause filling material to spill out. In addition, the load exerted on the supporting elements by the weight of the filling material is high, in particular with container volumes of 1.5 liters or more.

With the rotor according to the invention, the transfer from one rotor to the next can take place in an area of the path of the processing stations in which the path has a large radius of curvature. The forces that are generated during the change in the direction of rotation are thereby reduced, and the filling material sloshes less.

The shape of the path can preferably correspond to the periphery of a so-called orbiform curve. An orbiform curve is a closed curve of constant width. Its peripheral line touches all four sides of a suitable square in every position.

The advantage of a path in the form of an orbiform curve is that mutually opposing processing stations are always the same distance from one another. This allows process rotors to be designed with an advantageous routing of the feed lines to the processing devices located at the processing stations. If the processing devices must be supplied with compressed air and/or filling material, this typically occurs in the area of the rotational axis of the rotor via supply lines, which must compensate for the different distances of the processing stations from the rotational axis. Since with an orbiform curve, mutually opposing processing stations are always the same distance from one another, the feed lines can be designed such that the lines leading from the rotational axis to opposing processing stations have a constant overall length. Excess lengths, which must be suitably contained when the distance of a processing station from the rotational axis is shortened, are not necessary. The load on the lines is reduced, thus the lines have a longer usable life.

A suitable orbiform curve is similar to a Reuleaux triangle or some other Reuleaux polygon. The path thus follows a curve that is practically feasible in terms of design. In practice, the corners are embodied as rounded, to reduce maximum acceleration values in these areas. The sides have a convex shape. The corners of the orbiform curve are understood here as the areas that have a smaller radius of curvature, while the sides have a larger radius of curvature. Any other shape of orbiform curve is likewise suitable.

Orbiform curves that have an even number of corners are particularly suitable for the rotors according to the invention. The number of processing stations can advantageously correspond to a multiple of the number of corners of the orbiform curve. This ensures that the rotors will run well, without imbalance.

An even number of processing stations is preferred, so that in each case two processing stations can be arranged opposite one another. If the path has the shape of an orbiform curve, fixed arms that connect mutually opposing processing stations may also be used in place of telescopic arms, for example. The arms can then be displaceable at right angles to the axis, so that the radial position of the two processing stations can be controlled.

Figure 2:
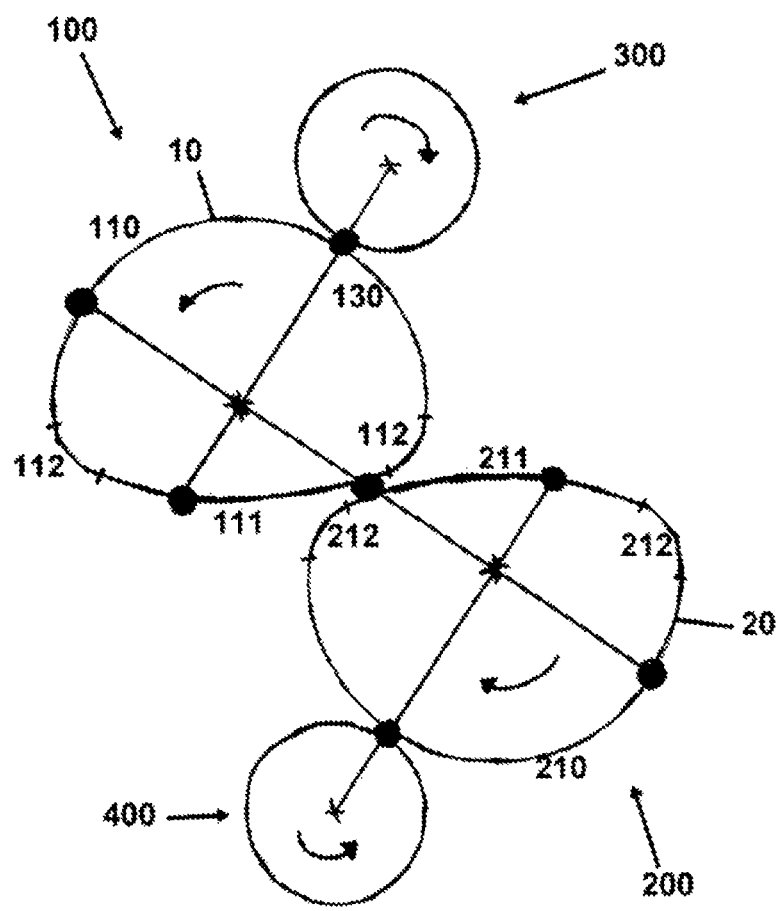
Figure 3:
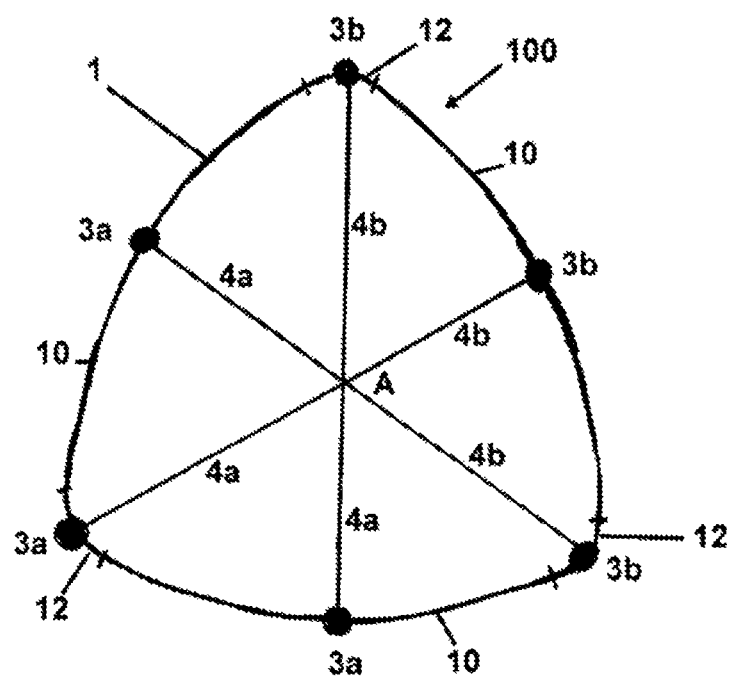
Figure 4:
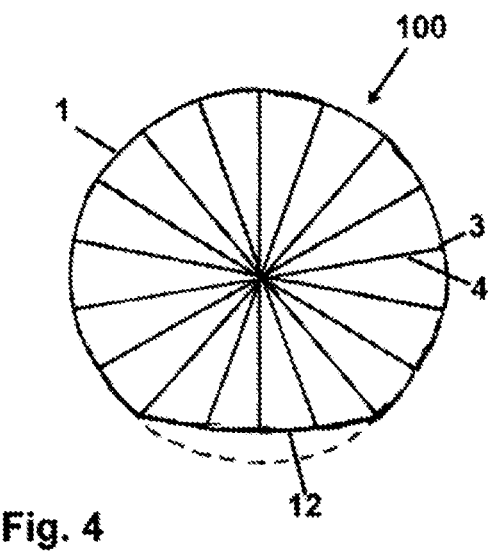
Figure 5:
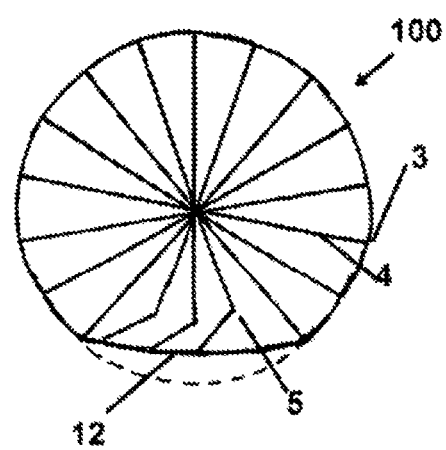

In the following, various exemplary embodiments of the invention will be explained in greater detail, with reference to the accompanying figures, in which:

FIG. 1 schematically shows a rotor according to the invention;

FIG. 2 schematically shows a forming and filling station and a sealing station of a machine for producing filled containers made from preforms, both of which have rotors according to the invention;

FIG. 3 schematically shows a rotor according to the invention, the path of which is similar to a Reuleaux triangle;

FIG. 4 schematically shows a rotor according to the invention with 18 processing stations and telescopic arms;

FIG. 5 schematically shows a rotor according to the invention with 18 processing stations and bendable arms.

It will be obvious to a person skilled in the art that the drawings shown here are intended merely to illustrate the principle of the invention and are rendered only schematically and not to scale. In particular, the illustrated dimensions and proportions of the elements are for illustrative purposes only. The number of processing stations in the figures is likewise decreased in the interest of clarity. The actual dimensions and proportions can be freely determined by a person skilled in the art based on his knowledge in the art.

FIG. 1 schematically illustrates the path 1 of a rotor 100 according to the invention. Shown is rotational axis A of rotor 100, about which processing stations 30, 31, 32 located on telescopic arms 4 rotate. The exemplary embodiment illustrated includes four processing stations 30, 31, 32. Of course, any number of processing stations can be arranged on the rotor.

In this exemplary embodiment, path 1 has essentially four different sections 10, 11, 12, which are delimited from one another in the diagram by markings. Section 10 extends substantially in a circle around rotational axis A, and thus has the radius r. Section 11 has a substantially smaller curvature than section 10 and thus has a significantly larger radius of curvature R. The two sections 12 represent the transition between areas 10 and 11 and have a greater curvature, that is to say, smaller radii of curvature than the other two sections.

In section 10, path 1 has a constant distance from rotational axis A. The distance from rotational axis A decreases continuously in sections 12 and 11 up to the center M of section 11 and then increases again.

The maximum distance of path 1 from rotational axis A of rotor 100 lies in area 10 and corresponds to the radius of curvature r in this area. The radius of curvature in area 11 is R and is substantially greater than the greatest distance r of the path from rotational axis A.

The centrifugal force acting on a container located in processing station 31 when rotor 100 is rotating is therefore substantially lower than the force acting on a container located in processing station 30.

Path 1 of the rotor is achieved by means of cam-controlled, telescopic arms 4.

FIG. 2 shows two rotors according to the invention, as shown in FIG. 1, in a section of a bottle filling system. The section shown comprises a rotor 100 of a filling station, where the containers are filled, and a second rotor 200 of a sealing station, where the filled containers are sealed. An input star wheel 300 is used to infeed empty containers. An output star wheel 400 is used to output the filled and sealed containers. The system typically comprises additional components upstream of input star wheel 300 and output star wheel 400, which are not shown here for the sake of simplicity.

The empty containers that are formed in a conventional manner, for example, in a blow molding process, and are input by input star wheel 300 are transferred to a processing station 130 at rotor 100 of a filling station in area 110.

The filling head of the filling station is attached to the container mouth and the container is filled. The forming and filling head remains on the filled container during the rotation of the rotor up to the end of path section 112. Despite the increased forces acting on the container in area 112, no filling material is able to spill out since the filling head is still attached to the container. In path section 111, due to the large radius of curvature of this section, the forces that are exerted are substantially lower than in areas 110 and 112. The filling head can be removed from the container mouth.

The container is then transferred to rotor 200 of the sealing station near the end of area 111. Rotor 200 is also embodied according to the invention, so that its path 20 has an area 211 with a large radius of curvature in the area where the container is transferred. As compared with conventional process wheels with circular paths, significantly reduced forces act on the container even during a change in the direction of curvature during the transfer between the filling station and the sealing station.

To prevent filling material from spilling out, the sealing device seals the mouth of a filled container before it reaches path section 212, where a greater acceleration is applied at least temporarily to the container.

FIG. 3 schematically illustrates a rotor 100, the path 1 of which has the shape of a so-called orbiform curve, here modeled as a so-called Reuleaux triangle, the corners of which are slightly rounded. An orbiform curve has the same diameter at every point. If opposing processing stations 3*a*, 3*b* are arranged on rotor 100, the total length of supporting arms 4*a* and 4*b* of two opposing processing stations 3*a*, 3*b* always remains unchanged. This simplifies the design of a process rotor, in particular a rotor with forming and/or filling stations, since the supply lines that lead to opposing processing stations 3*a*, 3*b*, such as, for example, compressed air or filling material lines, have a constant overall length.

In this assembly, arms 4*a*, 4*b* can be telescopic, or opposing arms 4*a*, 4*b* can be embodied together as rigid and displaceable via rotational axis A.

Path 1 has sections 10 that have a large radius of curvature, and sections 12 that have a small radius of curvature. In a section 10 having a large radius of curvature, the transfer to the next rotor can advantageously take place, whereas in sections 12 that have a small radius of curvature, containers that have already been filled, in particular, should be appropriately secured to prevent filling material from spilling out. This can be accomplished, for example, by leaving the filling head attached to the container in this section, or by other suitable measures.

FIG. 4 shows a rotor 100 according to the invention with 18 processing stations 3 at the end of telescopic supporting arms 4. Path 1 of the rotor is circular, with a section 12 in which the circle is flattened and has a smaller radius of curvature. In the flattened section 12, the circular path is indicated by a dashed line.

FIG. 5 shows a rotor 100 as in FIG. 4, in which the deviation from the circular path is not achieved by shortening the arm length of supporting arms 4. Rather, supporting arms 4 have joints 5 on which the arms can be bent opposite the direction of rotation of the rotor. Upon entering section 12, the arms are bent slightly, so that the processing stations 3 will follow the flattened course of the path. In this area, a container located in a processing stations can then be transferred to the next rotor within the apparatus. The empty supporting arms 4 can then fold back to their original position, and can return to following the circular path in section 10. The advantage of this configuration is that the overall length of each arm 4 remains unchanged. Supply lines for compressed air or filling material, for example, which are routed along arm 4, remain connected to the arm and do not temporarily have an excess length when the arm is telescopically shortened, as in the exemplary embodiment of FIG. 4.

The invention claimed is:

1. A rotor of an apparatus for forming containers from preforms or for filling containers made from preforms, having a rotational axis and processing stations rotating about the rotational axis for receiving preforms to be formed into containers or containers to be filled, wherein the processing stations move along a closed path around the rotational axis of the rotor, wherein a distance of the closed path from the rotational axis varies at different positions along the closed path, wherein a radius of curvature of at least one section of the closed path is greater than a greatest distance between the closed path and the rotational axis, and wherein the closed path defines an orbiform curve.

2. The rotor according to claim 1, wherein the rotor is equipped with telescopic, pivotable or bendable supporting arms for supporting the processing stations.

3. The rotor according to claim 1, wherein the processing stations are equipped with a processing device selected from the group consisting of a forming head, a filling head, a combined forming and filling head and a sealing device.

4. The rotor according to claim 1, wherein the orbiform curve is a Reuleaux triangle or a Reuleaux polygon.

5. The rotor according to claim 1, wherein the rotor has an even number of processing stations.

6. The rotor according to claim 1, wherein the rotor has mutually opposing processing stations, and wherein a distance between the mutually opposing processing stations is unchanged at every position on the closed path.

7. The rotor according to claim 1, wherein the rotor is equipped with rigid arms that are displaceable perpendicular to the rotational axis.

8. The rotor according to claim 1, wherein the rotor is equipped with arms that have joints at which the arms are bendable opposite a direction of rotation of the rotor.

\* \* \* \* \*